(12) United States Patent
Hanson et al.

(10) Patent No.: US 8,342,118 B2
(45) Date of Patent: Jan. 1, 2013

(54) SHEET COATING SYSTEM ON AN APPARATUS FOR EXTRUSION FORMING A SHEET PRODUCT

(75) Inventors: Dana R. Hanson, St. Charles, IL (US); Mitchell L. Gritzner, Montgomery, IL (US); Ryan E. Leopold, Sycamore, IL (US)

(73) Assignee: Processing Technologies, LLC, Aurora, IL (US)

( * ) Notice: Subject to any disclaimer, the term of this patent is extended or adjusted under 35 U.S.C. 154(b) by 627 days.

(21) Appl. No.: 12/455,352

(22) Filed: Jun. 1, 2009

(65) Prior Publication Data

US 2010/0301513 A1 Dec. 2, 2010

(51) Int. Cl.
*D06B 15/02* (2006.01)

(52) U.S. Cl. ........ 118/114; 118/206; 118/225; 118/226; 118/316; 118/325; 118/419; 118/428; 425/91; 425/93

(58) Field of Classification Search ............ 118/111, 118/114, 206, 225, 226, 227, 236, 255, 313, 118/316, 325, 419, 428, 672; 425/91, 93, 425/317
See application file for complete search history.

(56) References Cited

U.S. PATENT DOCUMENTS

| | | | | |
|---|---|---|---|---|
| 3,238,917 A * | 3/1966 | Burns | ............................. | 118/33 |
| 4,022,151 A * | 5/1977 | Achelpohl | ...................... | 118/33 |
| 4,259,921 A * | 4/1981 | Wallsten | ....................... | 118/206 |
| 4,845,964 A * | 7/1989 | Bors et al. | ........................... | 68/4 |
| 4,884,525 A * | 12/1989 | Fontaine et al. | ................ | 118/65 |
| 5,431,731 A * | 7/1995 | Salo et al. | ...................... | 118/225 |
| 5,601,648 A * | 2/1997 | Freisberg et al. | ............ | 118/419 |
| 5,888,013 A * | 3/1999 | Slobodkin | ....................... | 403/14 |
| 6,364,952 B1 * | 4/2002 | Naruse et al. | .................. | 118/411 |
| 6,387,180 B1 * | 5/2002 | Takahashi et al. | ............ | 118/216 |
| 2006/0035033 A1 * | 2/2006 | Tanahashi et al. | ......... | 427/421.1 |

* cited by examiner

*Primary Examiner* — Robert B Davis
(74) *Attorney, Agent, or Firm* — Wood, Phillips, Katz, Clark & Mortimer

(57) ABSTRACT

An apparatus for extrusion forming a sheet product having an extruder assembly with a sheet die through which a flowable material is delivered and a roll stand assembly made up of a roll stack sub-assembly and a sheet take-off sub-assembly. The roll stack assembly has first and second rolls between which a nip location is defined at which flowable material from the sheet die is delivered. The sheet take-off sub-assembly produces an advancing force upon a first sheet component made up of at least the first sheet layer. The roll stand assembly further has a coating system for applying a coating component to a surface on at least one sheet component advancing through the apparatus. The roll stand assembly is constructed to be reconfigured thereby to change a path traveled by the at least one sheet component and facilitate selective application of the coating component.

13 Claims, 6 Drawing Sheets

SHEET COATING SYSTEM ON AN APPARATUS FOR EXTRUSION FORMING A SHEET PRODUCT

BACKGROUND OF THE INVENTION

1. Field of the Invention

This invention relates to apparatus for extrusion forming sheet products and, more particularly, to a system for selectively applying a coating to one or more sheet surfaces during sheet product formation.

2. Background Art

There is a multitude of different apparatus used to continuously form sheet products made up of one or more extrusion-formed sheet layers. In one exemplary apparatus, an extrusion assembly, through a sheet die, delivers flowable material to a nip/lamination location between adjacent and cooperating rolls on a roll stand assembly. The roll stand assembly may consist of separate sub-assemblies that cooperate to draw formed sheet layers in a downstream direction ultimately towards a point where the completed sheet product is appropriately handled, as by being packaged, staged, etc. One of the sub-assemblies is a roll stack sub-assembly made up of at least the aforementioned two rollers, defining the nip location, and potentially additional rolls that reroute the advancing sheet layer(s) during the sheet product formation. The other sub-assembly performs a sheet take-off function, exerting an advancing force upon the sheet layer(s).

It is also known to incorporate coating systems into such apparatus. In one exemplary form, a silicone liquid is applied to one or more of the exposed surfaces of the advancing sheet layer(s). This coating may be applied for different purposes. Silicone coatings are commonly used to perform an antistatic function. Silicone coatings are also commonly applied to facilitate separation of products that may be ultimately formed from the sheet product, such as cups or the like, which are nested/stacked, one within the other.

Typically, such apparatus are used in facilities wherein they do not have a dedicated function to form a single type of sheet product. The components on the apparatus are thus typically designed to allow a substantial degree of flexibility in terms of the nature of the material extruded, the number of sheet layers ultimately incorporated into the end product, and the thickness of any such layer(s). The end sheet product may consist of a single layer or multiple layers that are concurrently formed and/or combined continuously during the sheet product formation.

Designers of such apparatus focus not only on the system flexibility, but also on the cost and size of the apparatus. The apparatus, by their very nature, have a substantial footprint. Since manufacturing space is often limited in facilities where this equipment is employed, it is important to keep the apparatus footprint as small as is reasonably possible. As the footprint for the apparatus increases, so do the costs associated with the manufacture of the end product, that must ultimately be borne by the consumer.

Given the size and weight of the potentially multiple layers that are handled by such apparatus, the components of the apparatus by necessity are inherently robust and expensive. Thus, reduction in component number is always present as an objective for system designers, without compromising system reliability and flexibility.

Heretofore, coating systems have been incorporated into such apparatus as a series of dedicated components. Commonly, a coating system will be incorporated between the aforementioned rolls on the roll stack sub-assembly and a pair of cooperating rolls on the sheet take-off sub-assembly that produces the advancing force on the sheet layer(s). This construction, while effective in terms of operation, adds a considerable dimensional component to the overall apparatus, between the upstream and downstream ends thereof.

In one form, separate coating systems are serially combined with capabilities of coating different sides of an advancing sheet component. Again, while effective, this design may add significantly to both the overall cost of the apparatus and its dimension between the upstream and downstream ends thereof. Further, these additional systems may increase overall time invested in regular set-up, maintenance and ongoing repairs.

Additionally, the overall control of the apparatus may be complicated by requiring reprogramming of controls to coordinate the operation of the coating systems as different products are manufactured during separate runs.

In spite of the industry's continuing focus upon apparatus that can be constructed and operated efficiently from the standpoint of both equipment purchase cost and ongoing operation and maintenance, and that: a) have a great deal of flexibility in terms of the different products that can be produced therewith; b) can be set up and operated on a relatively small footprint; and c) can be reliably and safely operated, the industry has contended with a number of the above problems, and others, since there has been a lack of viable alternative structures that address the shortcomings in the prior art.

SUMMARY OF THE INVENTION

In one form of the invention, an apparatus is provided for extrusion forming a sheet product. The apparatus has upstream and downstream ends and includes an extruder assembly having a sheet die through which a flowable material is delivered. The apparatus also has a roll stand assembly with a roll stack sub-assembly and a sheet take-off sub-assembly. The roll stack sub-assembly has first and second rolls between which a nip location is defined at which flowable material from the sheet die is delivered to define a first sheet layer. The sheet take-off sub-assembly is configured to produce a force upon a first sheet component, made up of at least the first sheet layer, that advances the sheet component downstream towards a point of use. The roll stand assembly further has a coating system for applying a coating component to at least one of two oppositely facing surfaces on at least one sheet component advancing through the apparatus. The roll stand assembly is constructed to be reconfigured so as to change a path traveled by the at least one sheet component and facilitate selective application of the coating component to the at least one sheet component.

In one form, the roll stand assembly can be reconfigured selectively between: a) a bypass state wherein neither of the two oppositely facing surfaces on the one sheet component can have the coating component applied thereto by the coating system; and b) a first coating state wherein at least one of: i) the coating component can be applied to one of the two oppositely facing surfaces on the one sheet component; and ii) the coating component can be applied to both of the two oppositely facing surfaces on the one sheet component.

In one form, the coating system has a first sparger for applying the coating component to one of the two oppositely facing surfaces on the at least one sheet component with the roll stand assembly in the first coating state.

In one form, the coating system has a second sparger for applying the coating component to the other of the two oppositely facing surfaces on the at least one sheet component.

In one form, the first and second spargers are configured to spray the coating component in first and second spray patterns and with the roll stand assembly in the bypass state the at least one sheet component moves in a path wherein the at least one sheet component is not exposed to the coating component in the first and second spray patterns.

In one form, the coating system includes a tank for a supply of the coating component. With the roll stand assembly in the bypass state, the at least one sheet component does not move through a supply of the coating component in the tank. With the roll stand assembly in the first coating state, the at least one sheet component moves through a supply of the coating component in the tank so that the coating component is thereby applied to both of the two oppositely facing surfaces on the at least one sheet component.

In one form, the sheet take-off sub-assembly has third and fourth rolls that cooperatively engage the at least one sheet component so as to produce a force upon the at least one sheet component that advances the at least one sheet component towards the point of use and, with the roll stand assembly in the first coating state, performs a squeegee function to strip excess of the coating component from the at least one sheet component.

In one form, the stripped excess coating component flows from the third and fourth rolls directly into the tank.

In one form, the coating system includes a first sparger for applying the coating component to one of the two oppositely facing surfaces on the at least one sheet component with the roll stand assembly in the first coating state. The coating system includes a first pump for delivering the coating component from the tank to the first sparger.

In one form, the coating system includes an idler roll that is moved between first and second positions corresponding respectively to the bypass and first coating states for the roll stand assembly.

In one form, the coating system includes a crank arm upon which the idler roll is mounted. The crank arm is pivotable about an axis between bypass and operative positions as an incident of which the idler roll is placed respectively in the first and second positions.

In one form, the coating system includes a drive system for repositioning the crank arm. The drive system has a translatable drive component that moves in opposite directions in a path as an incident of which the crank arm is pivoted between bypass and operative positions.

In one form, the coating system further includes a safety member, that obstructs access to part of the sheet take-off assembly, and the safety member follows movement of the drive component.

In one form, the sheet take-off sub-assembly includes third and fourth rolls that cooperatively engage the at least one sheet component at a pinch location so as to produce a force upon the at least one sheet component that advances the at least one sheet component towards the point of use. The drive component and safety member move together oppositely in a vertical direction. With the crank arm in the operative position, the safety member is moved vertically to obstruct horizontal access to the pinch location from an upstream location.

In one form, the drive system further includes an elongate link member that is pivotably connected to each of the drive component and crank arm.

In one form, the third and fourth rolls are the only rolls on the apparatus that cooperate to engage the at least one sheet component to perform either a squeegee function or exert an advancing force upon the at least one sheet component downstream of where the at least one sheet component advances through the tank.

In one form, the tank defines an accumulation location for the coating component that is the only accumulation location on the apparatus at which: a) the coating component is supplied for application to the at least one sheet component; and b) the applied coating component stripped from the at least one sheet component is collected for re-application to the at least one sheet component.

The invention is also directed to a method of extrusion forming a sheet product. The method includes the step of providing an apparatus with an extruder assembly and a roll stand assembly with a coating system to which flowable material is directed to produce at least one sheet component with two oppositely facing surfaces. The method further includes the step of selectively configuring the roll stand assembly in any of at least two different states wherein the at least one sheet component advances in different travel paths that allow selection from at least two of: a) application of a coating component through the coating system to one of the two oppositely facing surfaces on the at least one sheet component; b) application of the coating component through the coating system to both of the two oppositely facing surfaces on the at least one sheet component; and c) preventing application of the coating component through the coating system to either of the two oppositely facing surfaces on the at least one sheet component.

In one form, the step of providing an apparatus involves providing an apparatus wherein the roll stand assembly has a sheet take-off system with cooperating rolls that: a) strip excess applied coating component from the at least one sheet component: and b) exert a force upon the at least one sheet component that advances the at least one sheet component to a downstream point of use.

In one form, the step of providing an apparatus involves providing an apparatus with an idler roll and the step of selectively configuring the roll stand assembly involves repositioning the idler roll.

DETAILED DESCRIPTION OF THE PREFERRED EMBODIMENT

Figure 1:
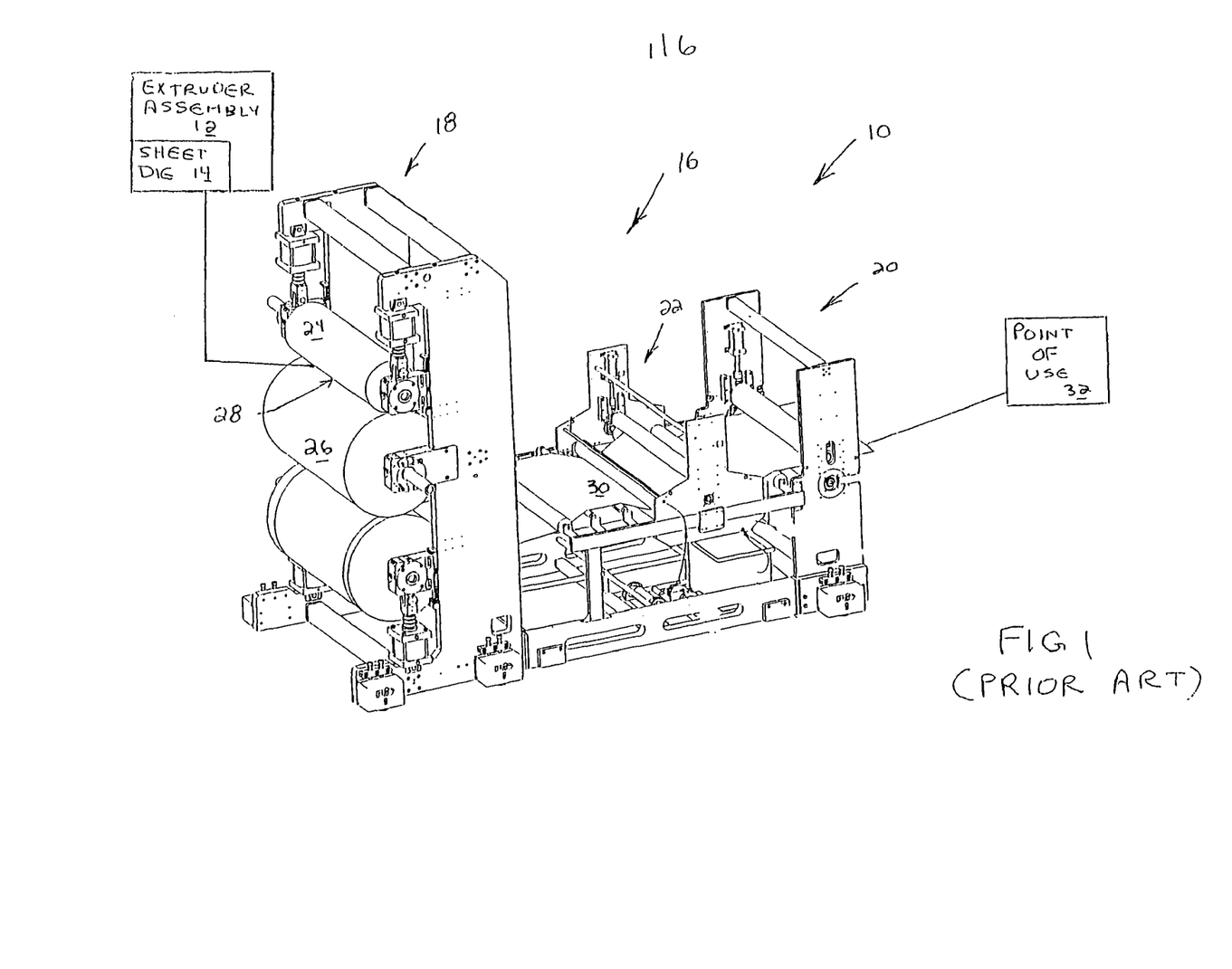
FIG. 1 is a partially schematic, perspective view of a conventional apparatus for extrusion forming a sheet product.
Figure 2:
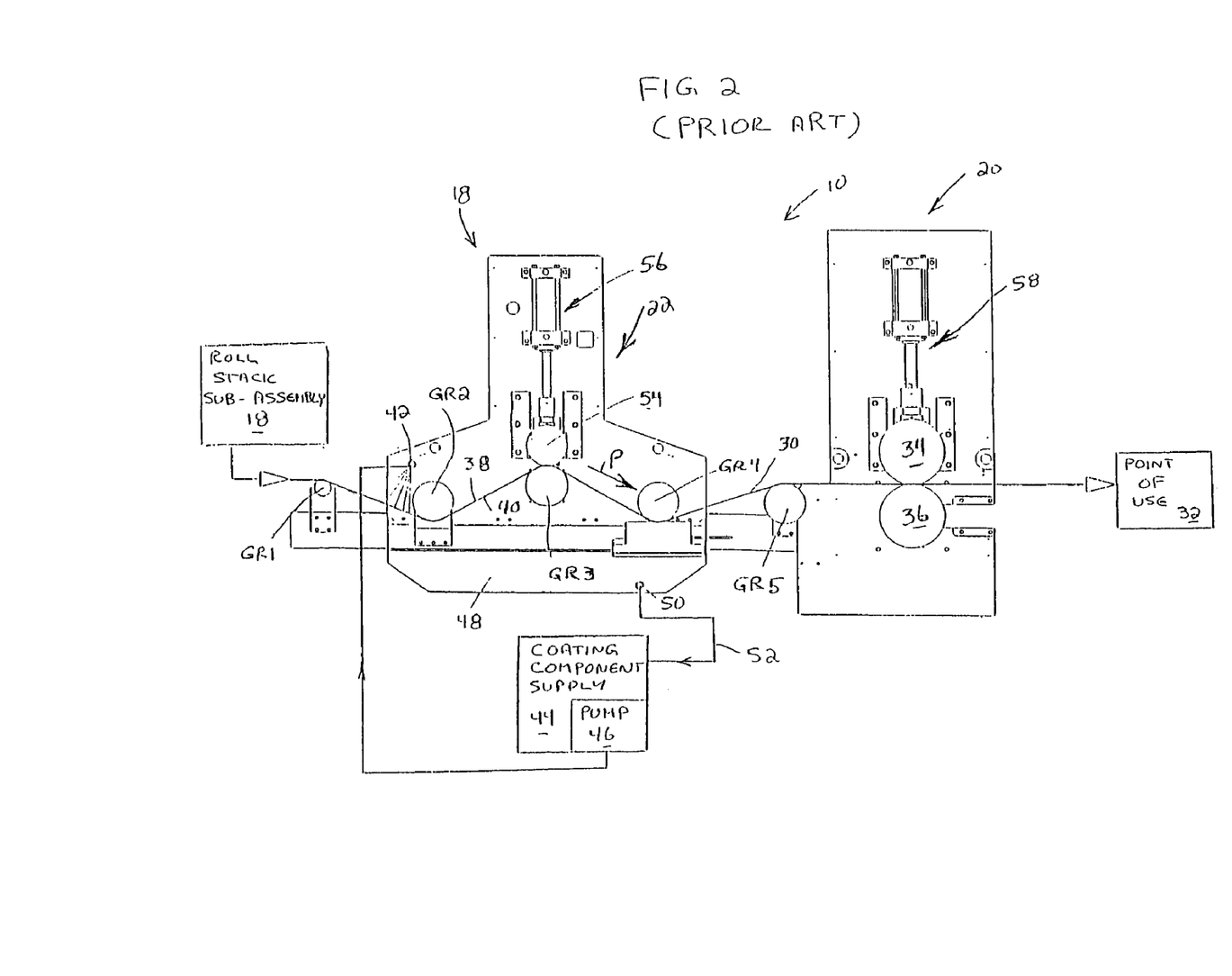
FIG. 2 is a side elevation view of the apparatus in FIG. 1.

In FIGS. 1 and 2, a conventional apparatus is shown at 10 for continuously extrusion forming a sheet product. The apparatus 10 consists of an extruder assembly 12 with a sheet die 14 through which flowable material is delivered to a roll stand assembly at 16. The roll stand assembly 16 consists of a roll stack sub-assembly 18, a sheet take-off sub-assembly 20, and a coating system at 22.

The roll stack sub-assembly 18 consists of first and second rolls 24, 26 between which a nip/lamination location at 28 is defined. Flowable material is delivered from the extruder assembly 12 through the sheet die 14 to the nip location 28. The flowable material is formed, through cooperation between the rolls 24, 26, into a sheet layer that makes up all or part of a sheet product that is delivered downstream to a point of use 32 at which the end sheet product is appropriately handled, as by being rolled, stored, staged, or further processed into another form.

A sheet layer 30 is caused to be advanced continuously between the upstream and downstream ends of the apparatus 10 by a force produced by cooperating rolls 34, 36 on the sheet take-off sub-assembly 20.

The sheet layer 30 departing the roll stack sub-assembly 18 has a coating of suitable composition applied to one or both of oppositely facing, top and bottom, surfaces 38, 40 thereon.

More particularly, the sheet layer 30 is advanced consistently in the same path P, as dictated by a series of guide rolls GR1, GR2, GR3, GR4, G5. Between the guide rolls GR1 and GR2, the sheet layer 30 is strategically angled to have the coating component applied thereto through a sparger 42 that produces a fanned spray pattern. The sparger 42 applies coating component delivered from a supply 44 thereof under pressure generated by a pump 46.

Excess coating component that does not adhere to the sheet layer 30 is accumulated in a coater tray 48. The coating component flows from a drain 50 at the bottom of the coater tray 48 through a return line 52 back to the supply 44 which resides in a container (not shown) that is separate from the coater tray 48.

Excess coating component is removed by a squeegee roll 54 that cooperates with the guide roll GR3. The thickness of the layer of coating component is controlled by varying the application pressure for the squeegee roll 54, which is effected through an hydraulic cylinder 56.

Another hydraulic cylinder 58 controls a pinching force between the cooperating rolls 34, 36, thereby to allow selection of an adequate pulling force, depending upon the nature of the sheet layer 30.

In the event that it is desired to apply the coating component to both surfaces 38, 40 on the sheet layer 30, the coater tray 48 can be dammed so that the level of the coating component therein is high enough that the sheet layer 30 moving in its path P will be fully immersed therein.

In the event that it is desired to coat the bottom surface 40 and not the top surface 38, the same sparger 42 can be used or a separate sparger (not shown) can be incorporated into the coating system 22.

As noted above, the apparatus 10 requires separate containers, in the form of the coater tray 48 and the container (not shown), for the coating component supply 44, that is fully separate from the coater tray 48. As a result, the excess and stripped coating component is required to be routed from the coater tray 48 to the coating component supply 44.

In the apparatus 10, the sheet take-off sub-assembly 20 and coating system 22 are cooperating, but fully independent, units. As is most evident from FIG. 2, this construction requires serial alignment of the sheet take-off sub-assembly 20 and coating system 22. This adds significantly to the footprint for the apparatus 10 and also significantly elongates the overall apparatus 10 in an upstream-to-downstream direction.

An apparatus, made according to the present invention, is shown at 60 in FIGS. 3-10. The apparatus 60 is configured to extrusion form a sheet product 62. The sheet product 62 can consist of a single layer or multiple layers with multiple compositions and thicknesses. The precise composition of the sheet product 62 is not critical to the present invention.

Figure 3:
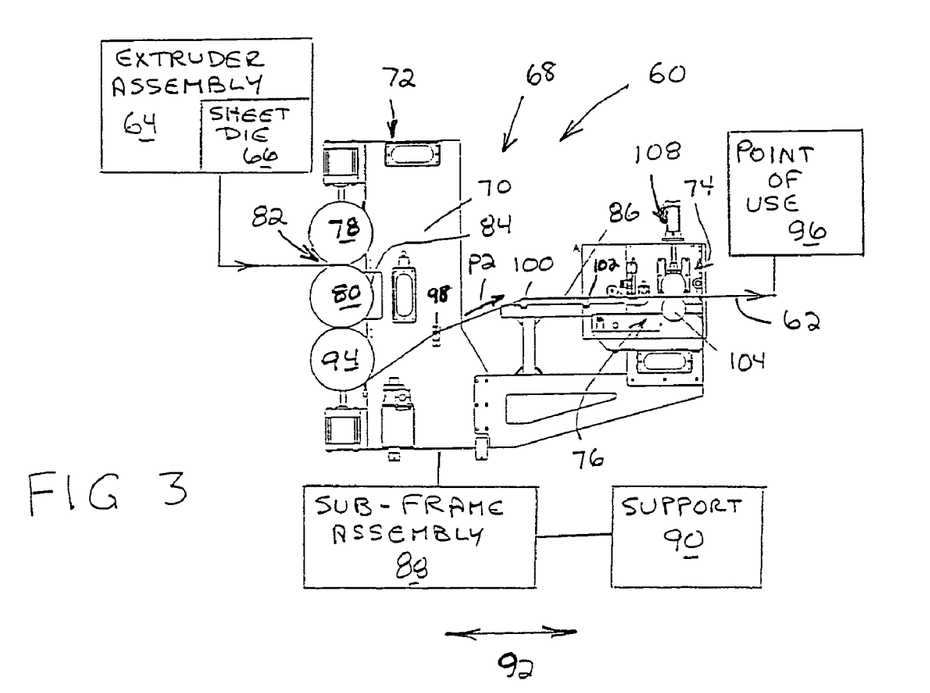
FIG. 3 is a partially schematic, side elevation view of an apparatus for extrusion forming a sheet product, according to the present invention, and incorporating a roll stand assembly that is capable of being reconfigured to different states, and with the roll stand assembly in a bypass state wherein a coating system on the roll stand assembly does not apply a coating component to a sheet component advancing therethrough.

The apparatus 60 consists of an extruder assembly 64 with a sheet die 66. The extruder assembly 64 cooperates with a roll stand assembly 68. The roll stand assembly 68 consists of a main frame 70 upon which various components are directly or indirectly mounted to define a roll stack sub-assembly 72, a sheet take-off sub-assembly 74, and a coating system 76. The sheet take-off sub-assembly 74 and coating system 76 have overlapping components and thus are not identifiable independent units. It should be noted, however, that while the sub-assemblies 72, 74 and coating system 76 are all mounted upon the main frame 70, components thereof could be separately mounted and independently movable relative to each other, as in an upstream-to-downstream direction.

The roll stack sub-assembly 72 consists of first and second rolls 78, 80 between which a nip/lamination location 82 is defined. Flowable material from the sheet die 66 is delivered to the nip location 82 from where it is formed into a sheet layer 84 that may make up the entire sheet product 62, or may be combined with one or more concurrently formed or preformed sheet layers to produce the sheet product 62. For purposes of simplicity of explanation herein, the sheet layer 84 will be considered to make up the entire thickness of the sheet product 62. However, it should be understood that the coating system 76 might apply a coating component to a surface on the sheet layer 84 alone, or on the sheet layer 84 and one or more surfaces on one or more additional layers that, while not shown, might potentially make up the sheet product 62. To encompass the anticipated variations, the apparatus 60 will be described with respect to a "sheet component" 86 consisting of at least the sheet layer 84.

The main frame 70 is mounted upon a sub-frame assembly 88 that is placed upon a subjacent support 90 for the entire apparatus 60. The main frame 70 and sub-frame assembly 88 cooperate to allow the roll stand assembly 68 to be moved selectively towards and away from the sheet die 66 on the extruder assembly 64 in an upstream-to-downstream direction, as indicated by the double-headed arrow 92. Through this arrangement, the roll stand assembly 68 can be moved away from the extruder assembly 64 to allow access by an operator between the roll stand assembly 68 and extruder assembly 64, as for set-up and maintenance. Through this arrangement, a precise spacing between the sheet die 66 and nip location 82 can also be set.

Figure 4:
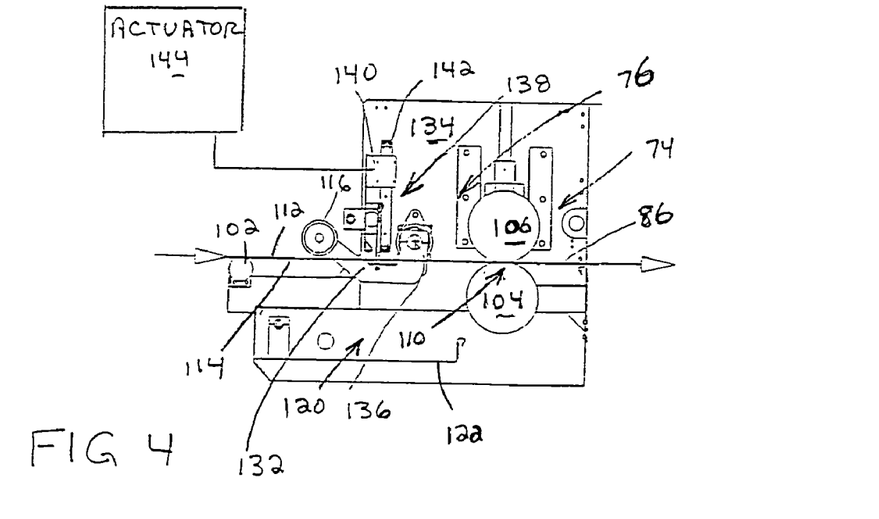
FIG. 4 is an enlarged, fragmentary, side elevation view of the downstream portion of the roll stand assembly in the state shown in FIG. 3.
Figure 5:
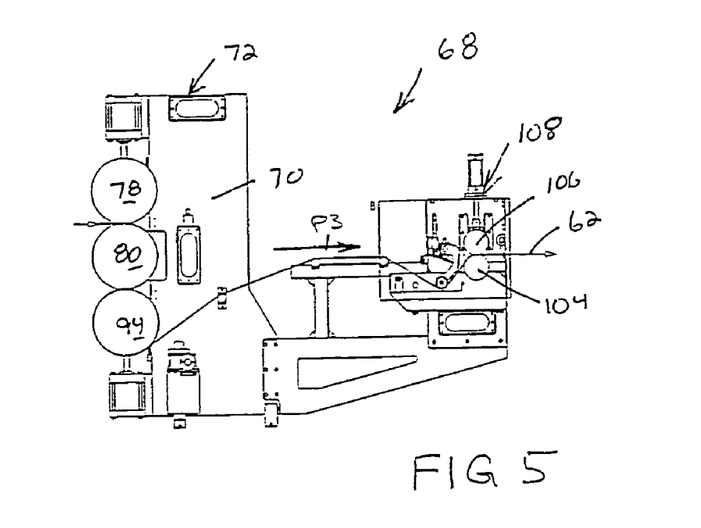
FIG. 5 is a view as in FIG. 3 with the roll stand assembly changed from the bypass state into a first coating state.
Figure 6:
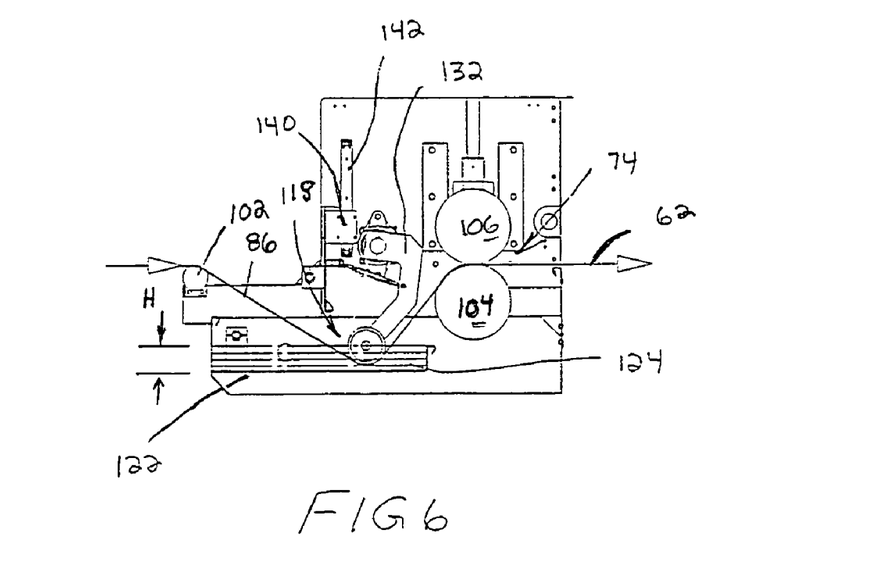
FIG. 6 is a view corresponding to that in FIG. 4, with the roll stand assembly in the first coating state of FIG. 5 and with the coating component being applied simultaneously to both sides of an advancing sheet component.
Figure 7:
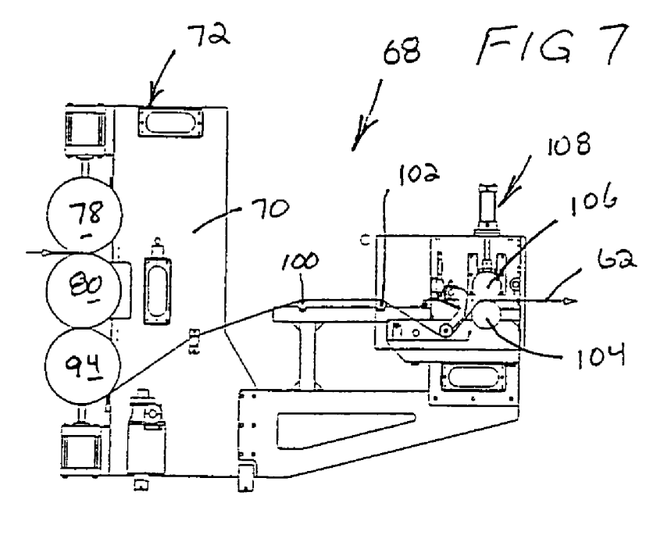
FIG. 7 is a view as in FIGS. 3 and 5 wherein the coating component is applied to one surface on the sheet component.
Figure 8:
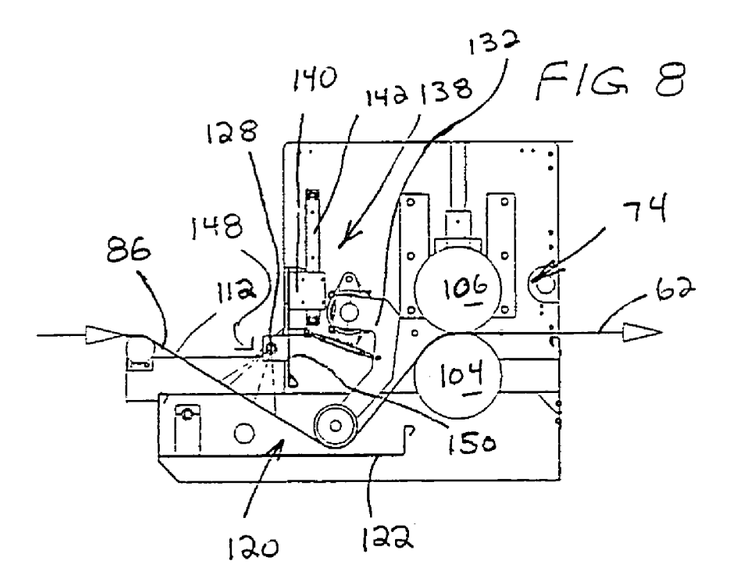
FIG. 8 is a view corresponding to that in FIGS. 4 and 6 with the roll stand assembly in the state shown in FIG. 7.
Figure 9:
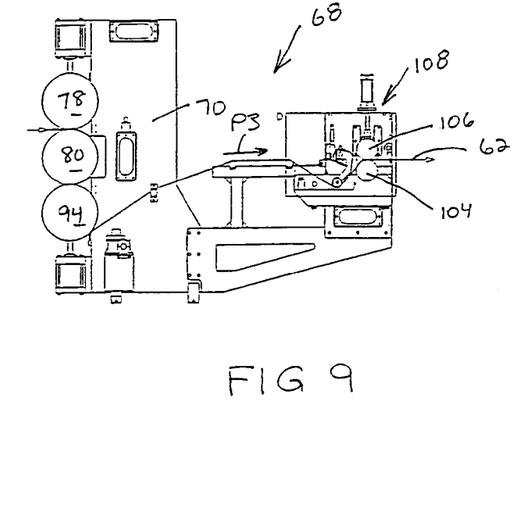
FIG. 9 is a view as in FIG. 7 wherein the coating component is applied to the side of the sheet component opposite that to which the coating component is applied in FIGS. 7 and 8.
Figure 10:
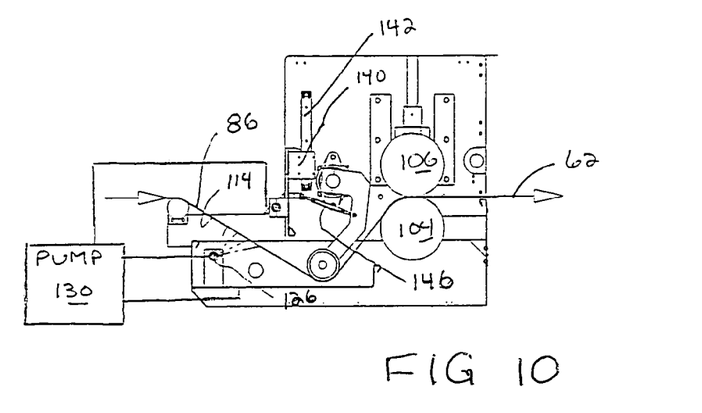
FIG. 10 is a view corresponding to that in FIG. 8 and with the roll stand assembly in the FIG. 9 state.

The sheet component 86, departing from between the rolls 78, 80, wraps around a third roll 94 on the roll stack sub-assembly 72 and is from there guided in a predetermined path P2, shown in FIGS. 3 and 4, to a downstream point of use 96. This guiding is effected by spaced guide rolls 98, 100, 102, 104.

The guide roll 104 makes up part of both the sheet take-off sub-assembly 74 and the coating system 76. As part of the former, the guide roll 104 cooperates with a roll 106 that is pressed thereagainst through an hydraulic cylinder 108. As the guide roll 104 is driven, the sheet component 86 is engaged by each of the rolls 104, 106 at a pinch location 110, thereby causing the sheet component 86 to advance in a downstream direction. The rolls 104, 106 cooperatively produce a force of a magnitude adequate to advance the sheet component 86 from the roll stack sub-assembly 72 to the point of use 96.

As part of the coating system 76, the guide roll 104 cooperates with the roll 106 to produce a squeegee action that removes excess coating component that is on the advancing sheet component 86.

The roll stand assembly 68 can be reconfigured selectively between a bypass state, as shown in FIGS. 3 and 4, and a first coating state, as shown in FIGS. 5-10. In the bypass state, the sheet component 86 advances through the roll stand assembly 68 in the path P2 without the application of any coating component to either of oppositely facing top and bottom surfaces 112, 114, respectively, on the sheet component 86. The sheet component 86 is guided by the guide rolls 100, 102, 104 in a substantially horizontal direction in the path P2 through the coating system 76 and sheet take-off sub-assembly 74 to the point of use 96.

The roll stand assembly 68 is constructed so that reconfiguration thereof, to change the roll stand assembly 68 from the bypass state into the first coating state, causes the sheet component 86 to travel in a path P3 that is different than the path P2, shown in FIGS. 3 and 4.

To accomplish the change in state for the roll stand assembly 68, an idler roll 116 is moved from a first position, as shown in FIGS. 3 and 4, to a second position, as shown in FIGS. 5-10. In the first position for the idler roll 116, the idler roll 116 is spaced above the path P2 traveled by the sheet component 86. In the second position therefor, the idler roll 116 is moved downwardly from the first position into the second position therefor wherein the idler roll 116 bears on the top surface 112 of the sheet component 86, thereby causing the sheet component 86 to move in a V-shaped path portion 118 downwardly from the guide roll 102 to around the idler roll 116, and upwardly therefrom to the guide roll 104. In the V-shaped path portion at 118, the sheet component 86 is caused to travel through a space 120 bounded by an upwardly opening receptacle/tank 122 within which a supply of coating component 124 can be retained.

The nature of the coating component 124 is not critical to the present invention. As one example, silicone can be applied as an anti-static measure and/or to facilitate separation of products that might be formed from the sheet product 62. As an example of the latter, it is known to construct cups from the end sheet product that are accumulated by being nested, one within the other. The silicone coating component 124 facilitates separation of the nested products.

The coating system 76 consists of a first sparger 126 for applying the coating component 124 on the bottom surface 114 of the sheet component 86, and a second sparger 128 for applying the coating component 124 on the top surface 112 of the sheet component 86. Each of the spargers 126, 128 is designed to direct coating component 124 in a fanned spray pattern. Suitable constructions for such spargers 126, 128 are well known in this art. The coating component 124 is delivered to each of the spargers 126, 128 through a pump 130 that pressurizes the coating component 124 so that it may be discharged in the appropriate volume. The pump 130 delivers the coating component 124 from an accumulation thereof in the space 120 bounded by the receptacle/tank 122.

It should be understood that the coating system 76 could incorporate just one of the spargers 126, 128, coating either one of the surfaces 112, 114. By incorporating two spargers 126, 128, greater overall system flexibility is afforded.

With the roll stand assembly 68 in the bypass state, the sheet component 86 moving in the path P2 is not exposed to the coating component 124 discharged by either of the spargers 126, 128.

With the roll stand assembly 68 in the first coating state, the apparatus 60 can be set up so that coating component 124 is applied to both of the oppositely facing surfaces 112, 114 on the sheet component 86 at the same time. The space 120 in the receptacle/tank 122 is dammed so that the coating component 124 accumulates to a height H, whereby the sheet component 86 traveling in the path P3 becomes fully immersed in the coating component 124.

As seen in FIGS. 3 and 4, with the roll stand assembly 68 in the bypass state therefor, the sheet component 86 is not moved in the path P2 through the space 120 and any accumulation of coating component 124 therein.

With the above-described arrangement, the operator can reconfigure the roll stand assembly 68 selectively between: a) a bypass state wherein neither of the two oppositely facing surfaces 112, 114 on the sheet component 86 will have the coating component 124 applied thereto; and b) a first coating state wherein at least one of: i) the coating component can be applied to one of the two oppositely facing surfaces 112, 114 on the sheet component 86; and ii) the coating component 124 can be applied to both of the two oppositely facing surfaces 112, 114 on the sheet component 86.

As noted above, the rolls 104, 106 perform a squeegee function after the coating component 124 is applied to one or both of the surfaces 112, 114 on the sheet component 86. Stripped, excess coating component 124 is caused to flow from the rolls 104, 106 directly back into the receptacle/tank 122.

By having the rolls 104, 106 perform the dual functions of drawing the sheet component 86 in a downstream direction and acting as a squeegee, the apparatus 60 can be made with these rolls 104, 106 being the only rolls that cooperate to engage the sheet component 86 to perform either a squeegee function or advancing function by exerting an advancing force upon the sheet component 86, downstream of where the sheet component 86 advances through the receptacle/tank 122.

Also, by pumping the coating component 124 from the receptacle/tank 122, and recovering stripped coating component 124 into the receptacle/tank 122, the receptacle/tank 122 defines an accumulation location for the coating component 124 that is potentially the only accumulation location on the apparatus 60 at which: a) the coating component 124 is supplied for application to the sheet component 86; and b) the applied coating component 124 stripped from the sheet component 86 is collected for re-application to the sheet component 86.

These two features potentially significantly simplify the overall construction of the apparatus 60 compared to the previously described apparatus 10. At the same time, the overall apparatus footprint can be minimized. The simplified construction does not compromise performance, yet offers a potentially less expensive version potentially requiring less maintenance and repair.

The coating system 76 has a crank arm 132 upon which the idler roll 116 is mounted. The crank arm 132 is mounted to a frame member 134 for pivoting movement around a laterally extending axis 136. Through this mounting arrangement, the crank arm 132 can be pivoted between a bypass position, as shown in FIG. 4, and an operative position, as shown in FIGS.

5-10, as an incident of which the idler roll 116 is placed respectively in the first and second positions therefor.

To reposition the crank arm 132, a drive system is provided at 138. The drive system 38 consists of a drive component 140 that is guided in translational movement along a vertical rail 142 in opposition directions in a path that is substantially fully vertical. The precise mechanism for the drive system 138 is not critical to the present invention. Geared interaction between components is preferred to positively move the crank arm 132 and maintain its selected position. An appropriate actuator 144 is provided that causes either manual or powered movement of the drive component 140.

The drive system 138 has an elongate link 146 with ends that are pivotably connected, one each, to the drive component 140 and crank arm 132. Through this arrangement, translational movement of the drive component 140 imparts a force that pivots the crank arm 132 around the axis 136 in a direction determined by the direction of translational movement of the drive component 140.

With the crank arm 132 pivoted to the position shown in FIGS. 5-10, redirection of the sheet component 86 downwardly creates a vertical gap 148. This gap 148 represents a potential danger; that being potential movement of an object or a limb of an operator therethrough in a horizontal direction towards the pinch location 110. To avoid this result, a safety member 150 is provided on the coating system 76. The safety member 150 is mounted to follow upward and downward movement of the drive component 140. The safety member 150 is mounted in depending fashion and, with the crank arm 132 in the position shown in FIGS. 5-10, closes a significant portion of the gap 148 and thereby obstructs horizontal access to the pinch location at 110 from an upstream location.

The inventive apparatus lends itself to compact and affordable construction. With the inventive concepts in hand, one skilled in the art might retrofit existing apparatus to allow the flexible coating capabilities, described above, while efficiently utilizing existing components without any compromise in overall system performance.

With the apparatus 60 constructed as shown, a method of extrusion forming a sheet product can be carried out as described below and shown schematically in FIG. 11.

Figure 11:
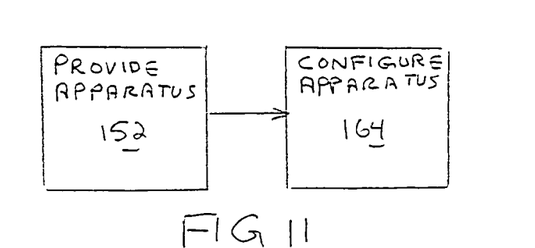
FIG. 11 is a schematic representation of a method of extrusion forming a sheet product according to the present invention.

More specifically, as shown at block 152 in FIG. 11, an apparatus is provided with the aforementioned extruder assembly 64 and roll stand assembly 68 with a coating system 76, against which flowable material is directed to produce at least one sheet component with two oppositely facing surfaces.

As shown at block 164, the roll stand assembly 68 is selectively configured into any of at least two different states wherein the at least one sheet component advances in different travel paths. These different travel paths allow for selection from at least two of: a) application of a coating component through the coating system to one of the two oppositely facing surfaces on the at least one sheet component; b) application of the coating component through the coating system to both of the two oppositely facing surfaces on the at least one sheet component; and c) preventing application of the coating component through the coating system to either of the two oppositely facing surfaces on the at least one sheet component.

The step of providing an apparatus may involve providing an apparatus wherein the roll stand assembly has a sheet take-off system with cooperating rolls that both: a) strip excess applied coating component from the at least one sheet component; and b) exert a force upon the at least one sheet component that advances the at least one sheet component towards a downstream point of use.

The foregoing disclosure of specific embodiments is intended to be illustrative of the broad concepts comprehended by the invention.

The invention claimed is:

1. An apparatus for extrusion forming a sheet product, the apparatus having upstream and downstream ends and comprising:

an extruder assembly comprising a sheet die through which a flowable material is delivered; and a roll stand assembly comprising a roll stack sub-assembly and a sheet take-off sub-assembly, the roll stack sub-assembly comprising first and second rolls between which a nip location is defined at which flowable material from the sheet die is delivered to define a first sheet layer, the sheet take-off sub-assembly configured to produce a force upon a first sheet component made up of at least the first sheet layer that advances the sheet component downstream towards a point of use, the roll stand assembly further comprising a coating system for applying a coating component to at least one of two oppositely facing surfaces on at least one sheet component advancing through the apparatus, the roll stand assembly constructed to be reconfigured thereby to change a path traveled by the at least one sheet component and facilitate selective application of the coating component to the at least one sheet component, wherein the roll stand assembly can be reconfigured selectively between: a) a bypass state wherein neither of the two oppositely facing surfaces on the one sheet component can have the coating component applied thereto by the coating system; and b) a first coating state wherein at least one of: i) the coating component can be applied to one of the two oppositely facing surfaces on the one sheet component; and ii) the coating component can be applied to both of the two oppositely facing surfaces on the one sheet component, wherein the coating system comprises a tank for a supply of the coating component and: i) with the roll stand assembly in the bypass state the at least one sheet component does not move through a supply of the coating component in the tank; and ii) with the roll stand assembly in the first coating state the at least one sheet component moves through a supply of the coating component in the tank so that the coating component is thereby applied to both of the two oppositely facing surfaces on the at least one sheet component, wherein the sheet take-off sub-assembly comprises third and fourth rolls that cooperatively engage the at least one sheet component so as to produce the force upon the at least one sheet component that advances the at least one sheet component towards the point of use and, with the roll stand assembly in the first coating state, performs a squeegee function to strip excess of the coating component from the at least one sheet component, wherein no other roll on the apparatus engages the at least one sheet component to perform either a squeegee function or exert an advancing force upon the at least one sheet component downstream of where the at least one sheet component advances through the tank between the tank and the third and fourth rolls.

2. The apparatus for extrusion forming a sheet product according to claim 1 wherein the coating system comprises a first sparger for applying the coating component to one of the two oppositely facing surfaces on the at least one sheet component with the roll stand assembly in the first coating state.

3. An apparatus for extrusion forming a sheet product, the apparatus having upstream and downstream ends and comprising:
- an extruder assembly comprising a sheet die through which a flowable material is delivered; and
- a roll stand assembly comprising a roll stack sub-assembly and a sheet take-off sub-assembly,
- the roll stack sub-assembly comprising first and second rolls between which a nip location is defined at which flowable material from the sheet die is delivered to define a first sheet layer,
- the sheet take-off sub-assembly configured to produce a force upon a first sheet component made up of at least the first sheet layer that advances the sheet component downstream towards a point of use,
- the roll stand assembly further comprising a coating system for applying a coating component to at least one of two oppositely facing surfaces on at least one sheet component advancing through the apparatus,
- the roll stand assembly constructed to be reconfigured thereby to change a path traveled by the at least one sheet component and facilitate selective application of the coating component to the at least one sheet component,
- wherein the roll stand assembly can be reconfigured selectively between: a) a bypass state wherein neither of the two oppositely facing surfaces on the one sheet component can have the coating component applied thereto by the coating system; and b) a first coating state wherein at least one of: i) the coating component can be applied to one of the two oppositely facing surfaces on the one sheet component; and ii) the coating component can be applied to both of the two oppositely facing surfaces on the one sheet component,
- wherein the coating system comprises a first sparger for applying the coating component to one of the two oppositely facing surfaces on the at least one sheet component with the roll stand assembly in the first coating state,
- wherein the coating system comprises a second sparger for applying the coating component to the other of the two oppositely facing surfaces on the at least one sheet component.

4. The apparatus for extrusion forming a sheet product according to claim 3 wherein the first and second spargers are configured to spray the coating component in first and second spray patterns and with the roll stand assembly in the bypass state the at least one sheet component moves in a path wherein the at least one sheet component is not exposed to the coating component in the first and second spray patterns.

5. The apparatus for extrusion forming a sheet product according to claim 1 wherein the stripped excess coating component flows from the third and fourth rolls directly into the tank.

6. The apparatus for extrusion forming a sheet product according to claim 5 wherein the coating system comprises a first pump for delivering the coating component from the tank to the first sparger.

7. The apparatus for extrusion forming a sheet product according to claim 1 wherein the coating system comprises an idler roll that is moved between first and second positions corresponding respectively to the bypass and first coating states for the roll stand assembly.

8. The apparatus for extrusion forming a sheet product according to claim 7 wherein the coating system comprises a crank arm upon which the idler roll is mounted and the crank arm is pivotable about an axis between bypass and operative positions as an incident of which the idler roll is placed respectively in the first and second positions.

9. The apparatus for extrusion forming a sheet product according to claim 8 wherein the coating system comprises a drive system for repositioning the crank arm, the drive system comprising a translatable drive component that moves in opposite directions in a path as an incident of which the crank arm is pivoted between bypass and operative positions.

10. An apparatus for extrusion forming a sheet product, the apparatus having upstream and downstream ends and comprising:
- an extruder assembly comprising a sheet die through which a flowable material is delivered; and
- a roll stand assembly comprising a roll stack sub-assembly and a sheet take-off sub-assembly,
- the roll stack sub-assembly comprising first and second rolls between which a nip location is defined at which flowable material from the sheet die is delivered to define a first sheet layer,
- the sheet take-off sub-assembly configured to produce a force upon a first sheet component made up of at least the first sheet layer that advances the sheet component downstream towards a point of use,
- the roll stand assembly further comprising a coating system for applying a coating component to at least one of two oppositely facing surfaces on at least one sheet component advancing through the apparatus,
- the roll stand assembly constructed to be reconfigured thereby to change a path traveled by the at least one sheet component and facilitate selective application of the coating component to the at least one sheet component,
- wherein the roll stand assembly can be reconfigured selectively between: a) a bypass state wherein neither of the two oppositely facing surfaces on the one sheet component can have the coating component applied thereto by the coating system; and b) a first coating state wherein at least one of: i) the coating component can be applied to one of the two oppositely facing surfaces on the one sheet component; and ii) the coating component can be applied to both of the two oppositely facing surfaces on the one sheet component,
- wherein the coating system comprises an idler roll that is moved between first and second positions corresponding respectively to the bypass and first coating states for the roll stand assembly,
- wherein the coating system comprises a crank arm upon which the idler roll is mounted and the crank arm is pivotable about an axis between bypass and operative positions as an incident of which the idler roll is placed respectively in the first and second positions,
- wherein the coating system comprises a drive system for repositioning the crank arm, the drive system comprising a translatable drive component that moves in opposite
- directions in a path as an incident of which the crank arm is pivoted between bypass and operative positions,
- wherein the coating system further comprises a safety member that obstructs access to part of the sheet take-off assembly and the safety member follows movement of the drive component.

11. The apparatus for extrusion forming a sheet product according to claim 10 wherein the sheet take-off sub-assembly comprises third and fourth rolls that cooperatively engage the at least one sheet component at a pinch location so as to produce the force upon the at least one sheet component that advances the at least one sheet component towards the point of use, the drive component and safety member move together oppositely in a vertical direction, and with the crank arm in the operative position, the safety member is moved vertically to obstruct horizontal access to the pinch location from an upstream location.

12. The apparatus for extrusion forming a sheet product according to claim 9 wherein the drive system further comprises an elongate link member that is pivotably connected to each of the drive component and crank arm.

13. The apparatus for extrusion forming a sheet according to claim 1 wherein the tank defines an accumulation location for the coating component that is the only accumulation location on the apparatus at which: a) the coating component is supplied for application to the at least one sheet component; and b) the applied coating component stripped from the at least one sheet component is collected for re-application to the at least one sheet component.

* * * * *